United States Patent [19]

Ishikura et al.

[11] Patent Number: 4,926,960
[45] Date of Patent: May 22, 1990

[54] ELECTRIC POWER STEERING APPARATUS FOR VEHICLE

[75] Inventors: Hisatugu Ishikura, Katsuta; Kazuo Tahara, Hitachi; Toshimi Abukawa, Hitachiota; Katsuji Marumoto; Toshiyuki Koterazaka, both of Hitachi; Mitsuyuki Hombu, Katsuta; Tadashi Takahashi, Hitachi; Hirohisa Yamamura, Hitachiota; Toru Tatsuzaki, Hiratsuka; Tsutomu Ohmae; Shuichi Takamatsu, both of Hitachi, all of Japan

[73] Assignees: Hitachi, Ltd., Tokyo; Hitachi Automotive Engineering Co., Ltd., Katsuta, both of Japan

[21] Appl. No.: 245,349

[22] Filed: Sep. 16, 1988

[30] Foreign Application Priority Data

Sep. 16, 1987 [JP] Japan .................. 62-229904

[51] Int. Cl.$^5$ ............................................. B62D 5/04
[52] U.S. Cl. ................... 180/79.1; 180/141; 180/142; 280/707; 364/424.05
[58] Field of Search ................... 180/79.1, 141, 142; 280/DIG. 1, 707, 91; 364/424.05

[56] References Cited

U.S. PATENT DOCUMENTS

| | | | |
|---|---|---|---|
| 4,212,366 | 7/1980 | Ohtuka et al. | 180/141 |
| 4,216,841 | 8/1980 | Ohtuka et al | 180/141 |
| 4,637,483 | 1/1987 | Eto et al. | 180/142 |
| 4,762,194 | 8/1988 | Morishita et al. | 180/79.1 |

*Primary Examiner*—Mitchell J. Hill
*Attorney, Agent, or Firm*—Antonelli, Terry, Stout & Kraus

[57] ABSTRACT

An electric power steering apparatus for a vehicle comprises a steering shaft, an electric motor operable to generate an auxiliary steering force having a magnitude corresponding to a value of electric current supplied thereto, a steering toque sensor for detecting a steering torque applied to the steering shaft, a vehicle weight sensor for detecting a vehicle weight, and a control device. The control device is constituted to increase and decrease the value of electric current to be supplied to the electric motor in accordance with not only the increase and decrease of the value detected by the steering torque sensor but also the increase and decrease of the value detected by the vehicle weight sensor.

4 Claims, 3 Drawing Sheets

ELECTRIC POWER STEERING APPARATUS FOR VEHICLE

BACKGROUND OF THE INVENTION

The present invention relates to an electric power steering apparatus for vehicles which can be suitably used in passenger cars, and more particularly to a power steering apparatus of the type which, by employment of an electric motor, is capable of generating an auxiliary steering force, i.e., a force for assisting steering operations.

Hydraulic power steering apparatus are generally used as power steering apparatus which serve to lighten the operation of the steering wheel of an automobile and the like and hence to improve driving safety. However, electric power steering apparatus have recently attracted attention for the reason that they not only facilitate energy savings and increase the items which can be controlled, but also offer an advantage of making the apparatus into a smaller size which may be easily mounted in a vehicle. Such electric power steering apparatus is disclosed in, for example, the publication of Japanese Pat. Laid-Open No. 184171/1986.

The power steering apparatus described in the above publication comprises a steering shaft, an electric motor operable to generate an auxiliary steering force having a value or magnitude corresponding to the value of an electric current supplied thereto, means for detecting an operational state of the power steering apparatus, and means for controlling the value of electric current supplied to the electric motor in accordance with a value detected by the detecting means. The detecting means includes a steering torque sensor for detecting the steering torque applied to the steering shaft from a steering wheel.

It is an object of power steering apparatus to generate an auxiliary steering force, i.e., a force for assisting the operation of a steering wheel by the driver, in order to reduce the force required for the driver to turn operate the steering wheel. In the power steering apparatus described in the abovementioned publication, the value of electric current supplied to the electric motor is controlled by inputting a signal of the steering torque detected by the steering torque sensor, and the auxiliary steering force having a magnitude controlled in accordance with the magnitude of the detected steering torque is generated. However, when the magnitude of the auxiliary steering force is controlled solely on the basis of the detected steering torque, the steering force which has to be actually applied to the steering wheel by the driver remains constant regardless of the steering angle of the steering wheel because the value or magnitude of the auxiliary steering force increases and decreases according to the increase and decrease, respectively, of the value or magnitude of the detected steering torque. This hinders the driver from sensing the steering angle of wheel, and hence is unpreferable in view of the driver's feel of the steering operation.

In the aforementioned conventional power steering apparatus, the steering angle of the steering shaft connected to the steering wheel is detected by the steering angle sensor and the detected value is inputted in the controlling means so that the value of electric current supplied to the electric motor may be restricted in response to the increase in the detected value. In this way, the auxiliary steering force is reduced or eliminated and hence the steering force required for the driver to operate the steering wheel is increased when the steering angle reaches a value greater than a predetermined value.

However, the steering force actually required depends upon various factors. For example, the required steering force changes when a vehicle weight or the load applied to the wheels (front wheels) is changed. In other words, if the load on the front wheels is increased due to an increased number of passengers, an increased torque is required for "steering without driving", i.e., an increased torque is required for the steering operation effected under condition that the vehicle is not driven (the magnitude of the torque required for the "steering without driving" being proportional to the load applied to the front wheels). Also during running of the vehicle, an increased torque is required for steering operations when the load on the front wheels is increased. Since the aforementioned prior art apparatus is constructed without taking account of this fact, the auxiliary steering force becomes insufficient and hence it becomes difficult to smoothly perform steering operations particularly when the steering angle is increased.

SUMMARY OF THE INVENTION

In view of the above-described problems, it is an object of the present invention to provide an electric power steering apparatus for a vehicle which enables a suitable auxiliary steering force to be generated constantly regardless of the increase and decrease in number of passengers and the load on the vehicle.

It is another object of the invention to provide an electric power steering apparatus for a vehicle which enables the driver to experience a good feel of steering operation.

According to the invention, there is provided an electric power steering apparatus for a vehicle comprising a steering shaft, an electric motor operable to generate an auxiliary steering force having a magnitude corresponding to a value of electric current supplied thereto, means for detecting an operational state of the steering apparatus, including a steering torque sensor for detecting a steering torque applied to the steering shaft and a vehicle weight sensor for detecting a vehicle weight, and means for controlling a value of electric current to be supplied to the electric motor in accordance with a value detected by the detecting means, the controlling means being constituted to increase and decrease the value of electric current to be supplied to the electric motor in accordance with increase and decrease, respectively, of the value detected by the steering torque sensor, and to increase and decrease the value of electric current to be supplied to the electric motor in accordance with the increase and decrease, respectively, of the value detected by the vehicle weight sensor.

The power steering apparatus according to the invention is substantially identical with the prior art in that the value of electric current supplied to the electric motor is increased and decreased in accordance with an increase and decrease, respectively, of the value detected by the steering torque sensor so that the magnitude of the auxiliary steering force may be increased and decreased correspondingly. However, the steering apparatus of the invention is different from the prior art in the point that the vehicle weight is detected by the vehicle weight sensor and the value of electric current supplied to the electric motor is increased and decreased in accordance with an increase and decrease, respectively, of the value detected by the latter sensor, so that the auxiliary steering force is controlled to be increased and decreased in accordance with the vehicle weight. In other words, the auxiliary steering force is controlled in response to changes in the vehicle weight so that an appropriate auxiliary steering force or assisting force may be obtained.

Other objects, characteristics and advantages of the invention will become more clear from the following description of the preferred embodiment with reference to the accompanying drawings.

DETAILED DESCRIPTION OF THE PREFERRED EMBODIMENT

Figure 1:
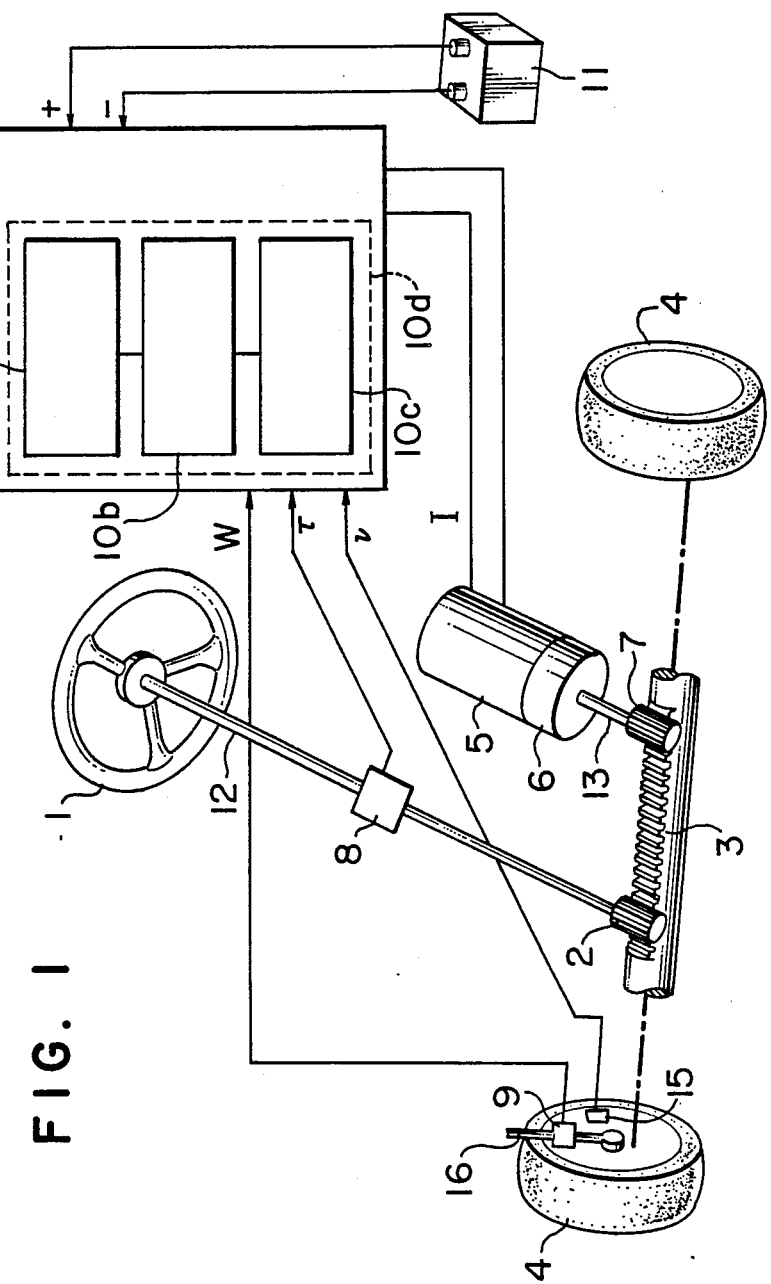
FIG. 1 is a schematic view showing an entire construction of an electric power steering apparatus according to an embodiment of the present invention.

FIG. 1 shows an electric power steering apparatus according to an embodiment of the invention which is constructed as a steering system of the rack-and-pinion type. As shown in FIG. 1, one end of a steering shaft 12 is connected to a steering wheel 1, and a pinion 2 that engages with a rack 3 is fixed to the other end of the shaft 12. A speed reduction gear unit 6 is provided at one end of an electric motor 5 which serves as an electric actuator for generating an assisting force, i.e., an auxiliary steering force. A pinion 7 is provided at one end of an output shaft 13 extending from the speed reduction gear unit 6 and this pinion engages with the rack 3. In this power steering apparatus, the rack 3 is put into reciprocating motion by the rotation of the pinion 2 which is produced by applying the steering torque to the steering shaft 12 from the steering wheel 1 and the rotation of the pinion 7 produced by driving the electric motor 5, whereby the steering operation of two wheels 4 (front wheels) connected to the rack 3 is performed.

On the steering shaft 12 is mounted a steering torque sensor 8 for detecting the steering torque applied to the steering shaft 12 from the steering wheel 1. At a suspension portion 16 of one of the front wheels 4 is mounted a vehicle weight sensor or a load sensor 9 for detecting the weight of the vehicle, i.e., the load applied to the front wheels 4. A sensor of the linear potentiometer type or the like which is constituted to detect the displacement of the suspension portion 16 due to the load (vehicle weight) applied thereto can be used as the load sensor 9. Further a vehicle speed sensor 15 for detecting the vehicle speed is provided on one of the front wheels 4. Since of sensors 8, 9 and 15 per se are well-known, detailed description of these sensors is omitted. The value detected by each of these sensors 8, 9 and 15, i.e., the output signal of each of the sensors, is inputted in a control device 10. An electric source 11 composed of battery mounted on the vehicle is connected to the electric motor 5 through the control device 10. The control device 10 includes an operation unit 10d, i.e., a microcomputer, having an operation portion 10a, a memory 10b and a controller 10c.

When the steering wheel 1 of the power steering apparatus is rotated, the steering torque applied to the steering shaft 12 is detected by the torque sensor 8, and a signal representing the detected steering torque $\tau$ is inputted to the control device 10. The control device 10 allows the electric source 11 to supply to the electric motor 5 an electric current I of a value corresponding to the torque signal. Thus, the electric motor 5 generates the torque, and applies to the rack 3 the required assisting force through the speed reduction gear unit 6 and the pinion 7.

Figure 2:
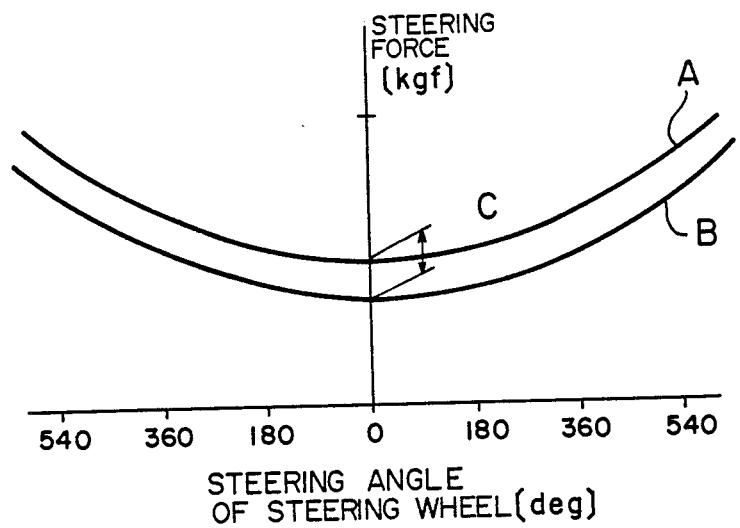
FIG. 2 is a schematic view showing the relationship among a steering angle of a steering wheel, an entire steering force required for the steering operation and an assisting force.

The relationship between the signal representing the steering torque $\tau$ detected by the torque sensor 8 and the assisting force is as follows:

In this type of steering apparatus, when it is assumed that no assisting force is generated the relationship between the steering angle (degree) of the steering wheel 1 and the entire steering force (kgf) required for operating the steering wheel 1 may be represented by a curve A in FIG. 2. Namely, the steering force required for handling or operating the steering wheel gradually increases as the steering angle of the steering wheel 1 increases.

Figure 3:
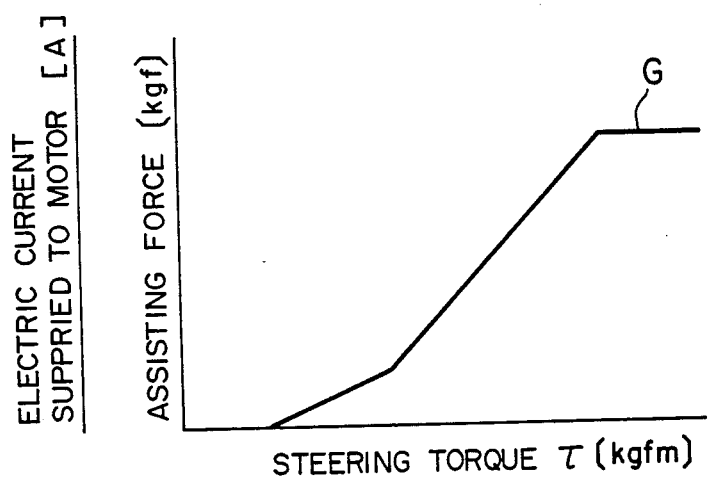
FIG. 3 is a schematic view showing the variations of the value of electric current supplied to an electric motor and the magnitude of the assisting force in relation to the variation of the steering torque.

On the other hand, FIG. 3 shows the relationship among the steering torque $\tau$ (kgfm) required for handling or operating the steering wheel, the electric current I [A] supplied to the electric motor and the assisting force (kgf), the relationship being adopted in the conventional power steering apparatus. As shown by a characteristic line G in FIG. 3, the value of the electric current I and hence the magnitude of the assisting force increase as the steering torque increases, until the steering torque required for handling the steering wheel reaches a predetermined value. The magnitude of the assisting force thus increased according to the increase of the steering torque may be represented by a curve B in FIG. 2 which is parallel to the curve A. Accordingly, the steering force actually applied by the driver is of a value C obtained by subtracting the assisting force shown by the curve B from the value of the steering force shown by the curve A. As will be understood from this fact, the steering force or torque actually applied by the driver becomes always constant regardless of the steering angle of the steering wheel.

As previously described, it is undersirable for the driver that the steering force or torque applied by the driver always becomes constant regardless of the steering angle of the steering wheel, because the driver cannot sense or feel the steering angles of the front wheels 4.

Figure 4:
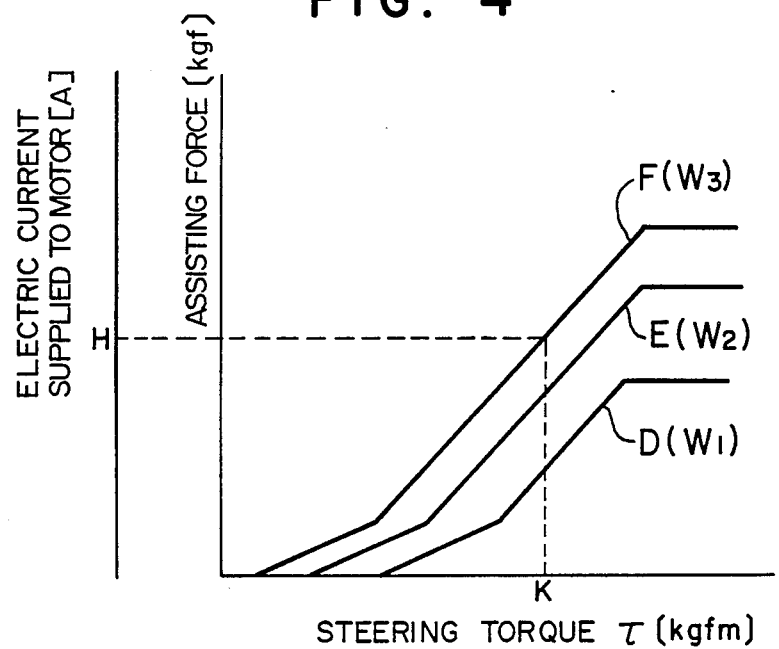
FIG. 4 is a schematic view for explaining the relationship between the steering torque, and the electric current supplied to the electric motor as well as the assisting force in the embodiment shown in FIG. 1.

Taking the abovementioned point into consideration, the power steering apparatus of the embodiment shown in FIG. 1 is constituted to effect such control as the one represented by the relationship or the functional characteristics between the steering torque, and the electric current supplied to the electric motor or the assisting force shown in FIG. 4. As described above, in the prior art apparatus, the relationship among the steering torque $\tau$ required for operating the steering wheel, the electric current I supplied to the electric motor and the assisting force is as shown by a characteristic line G in FIG. 3. On the other hand, in FIG. 4, there are shown characteristic lines D, E and F each of which is similar to the characteristic line G shown in FIG. 3. These characteristic lines D, E and F represent the relationship among the steering torque, the electric current I supplied to the electric motor and the assisting force when the vehicle weight or the load applied to the front wheels 4 is $W_1$, $W_2$ and $W_3$, respectively. In other words, FIG. 4 shows the relationship among the steering torque, the electric current I supplied to the electric motor and the assisting force as a plurality of functional characteristics classified using the load as a parameter. The loads $W_1$, $W_2$ and $W_3$ are respectively small, medium and large loads ($W_1 < W_2 < W_3$).

In the illustrated embodiment, the plurality of functional characteristics shown in FIG. 4, which represent the relationship between the steering torque and the electric current supplied to the electric motor, are stored as a table in the memory 10b of the operation unit 10d in the control device 10. When the signal of the steering torque $\tau$ detected by the torque sensor 8 and the signal of the load W on the front wheels detected by the load sensor 9 are inputted in the control device 10, the operation unit 10d selects one of the functional characteristics (i.e., one of the characteristic lines D, E, F) according to the load signal and calculates an electric current value on the selected functional characteristic which corresponds to the value detected by the torque sensor 8. Thus, the control device 10 produces an output signal for allowing the electric current I of the value corresponding to the value of the steering torque $\tau$ on the selected functional characteristic to be supplied to the electric motor 5. For example, when the load on the front wheels 4 becomes large and hence the torque required for the "steering without driving" is correspondingly increased, the characteristic line F corresponding to the load $W_3$ on the front wheels is selected. Therefore, the value of the electric current I supplied to the electric motor 5 when a predetermined steering torque $\tau$ is applied to the steering shaft 12 is increased by a value corresponding to the increase in the torque required for the "steering without driving". Thus, the assisting force is also increased by the value corresponding to the increase in the torque required for the "steering without driving".

In the description made hereinabove, the memory 10b stored therein the three functional characteristics, i.e., the characteristic lines F, E and D shown in FIG. 4, which correspond to the large, medium and small loads. However, the number of the functional characteristics need not be limited to three. For example, it is possible to store many functional characteristics corresponding to various vehicle weights in the memory 10b so as to enable the generation of an assisting force of the magnitude appropriately controlled in response to even a slight change in the vehicle weight.

As will be apparent from the above description, in the illustrated embodiment, it is possible to generate an appropriate assisting force controlled in accordance with the variation of the vehicle weight. Thus it is capable of removing such disadvantage that the assisting force becomes insufficient, during all conditions of steering including "steering without driving", and of always effecting proper steering. In addition, since the electric current I supplied to the electric motor 5 is limited or restricted in accordance with the vehicle weight, wasteful electric power consumption can be prevented particularly when the steering angle of the steering wheel reaches the maximum. Namely, when the vehicle weight is small for example, the characteristic line D shown in FIG. 4 is selected, and in this case the electric current I does not become a value larger than a predetermined value even if the steering angle of the steering wheel reaches the maximum. Thus, the electric power can be used efficiently. Further, since the generation of unnecessary assisting force, at the time when the steering angle of the steering wheel approaches the maximum, can be prevented by limiting the value of the electric current I as described above, an improved feel of steering can be obtained.

In order to obtain an appropriate assisting force controlled in accordance with the variation of the vehicle weight as described above, some sensor needs to be provided. The illustrated embodiment uses as the latter sensor the load sensor 9 mounted on the suspension portion 16 of the front wheel 4. However, when a load sensor is provided in a vehicle for other purposes, the output signal of such load sensor may be inputted in the control device 10. For example, various sensors which are capable of detecting vehicle weight have recently been used for the height control of automobiles. In such a case, if the output signal of such sensor for controlling the vehicle's height is inputted in the control device 10, an additional load sensor need not be provided for controlling the assisting force in accordance with the vehicle weight. In such case, the control of the assisting force can be effected at low cost.

Figure 5:
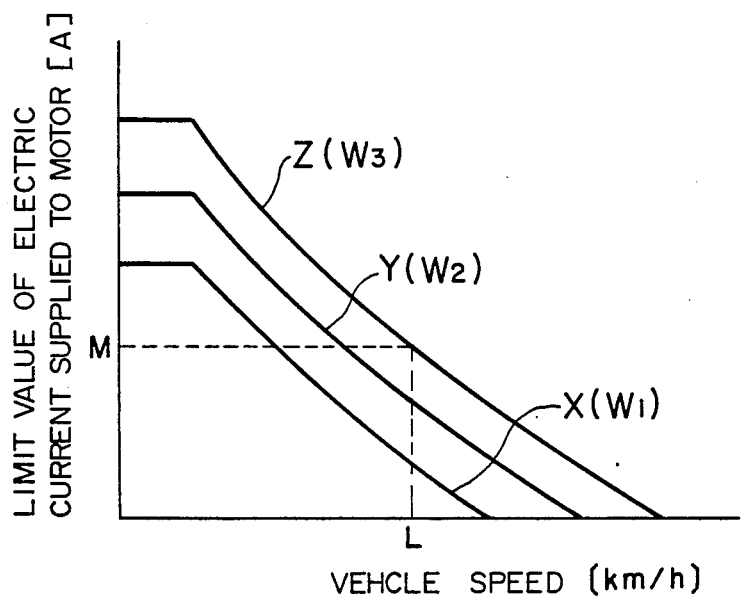
FIG. 5 is a schematic view for explaining the relationship between a vehicle speed and the limit value of the electric current supplied to the electric motor in the embodiment shown in FIG. 1.

In this kind of power steering apparatus, it is desirable from the viewpoint of steering stability during running of the vehicle at a high speed to reduce the assisting force as the running speed of the vehicle increases. The illustrated embodiment is constructed under consideration of also this point. More particularly, in the illustrated embodiment, a signal of the vehicle speed V detected by the vehicle speed sensor 15 is inputted in the control device 10, and a table of the functional characteristics as shown in FIG. 5 is stored in the memory 10b of the operation unit 10d in the control device 10. Further, the control device 10 is constituted to limit the value of electric current supplied to the electric motor 5 in accordance with the value detected by the vehicle speed sensor 15.

FIG. 5 shows the relationship between the vehicle speed V and the maximum or limit value of the electric current supplied to the electric motor 5 as three functional characteristics classified using the vehicle weight as a parameter. In this figure, characteristic lines X, Y, Z respectively show the characteristics at a small load $W_1$, a medium load $W_2$ and a large load $W_3$. As can be seen from these characteristic lines, at each of the loads, the limit value of the electric current supplied to the electric motor 5 decreases as the vehicle speed increases from a predetermined value. For example, according to the characteristics shown in FIG. 4, if the load is $W_3$ and the steering torque is K, the electric current of a predetermined value H is supplied to the electric motor 5. Even in this case, however, if the vehicle speed V reaches a predetermined value L, the maximum value of the electric current I is limited to M as will be understood from FIG. 5. In other words, if the value H is greater than M, the electric current is limited to M and the assisting force generated by the electric motor 5 is also limited to a corresponding smaller value.

When the value of the electric current supplied to the electric motor is controlled in accordance with the vehicle speed as described above, the driver's feel of the steering operation may be further improved and the stability of steering operation during running at a high speed may be assured. In the above description made hereinabove with reference to FIG. 5, the three functional characteristics (i.e., the characteristic lines Z, Y, X) corresponding to large, medium and small loads were stored in the memory 10b. However, the number of the functional characteristics need not be limited to three. For example, many functional characteristics corresponding to various vehicle weights may be stored in the memory 10b so as to enable the generation of an assisting force of the magnitude appropriately controlled in response to even a slight change in the vehicle weight.

As will understood from the foregoing description, the steering apparatus of the present invention is capable of controlling the auxiliary steering force while taking the vehicle weight into consideration. Thus, it is possible to control the auxiliary steering force constantly to an appropriate value regardless of the driving state of the vehicle.

What is claimed is:

1. An electric power steering apparatus for a vehicle comprising:
   a steering shaft;
   an electric motor operable to generate an auxiliary steering force having a magnitude corresponding to a value of electric current supplied thereto;
   means for detecting an operational state of said steering apparatus, said detecting means including a steering torque sensor for detecting a steering torque applied to said steering shaft and a vehicle weight sensor for detecting a vehicle weight; and
   means for controlling a value of electric current to be supplied to said electric motor in accordance with a value detected by said detecting means, said controlling means being constituted to increase and decrease the value of electric current to be supplied to said electric motor in accordance with increase and decrease, respectively, of the value detected by said steering torque sensor, and to increase and decrease the value of electric current to be supplied to said electric motor in accordance with the increase and decrease, respectively, of the value detected by said vehicle weight sensor such that the increase and decrease in the value of electric current based on the value detected by the steering torque sensor is modified by the value detected by the vehicle weight sensor and the auxiliary steering force is increased with increases in vehicle weight.

2. A power steering apparatus according to claim 1, wherein said detecting means further includes a vehicle speed sensor for detecting a vehicle speed, and said controlling means is constituted to restrict the value of electric current to be supplied to said electric motor in accordance with an increase in the value detected by said vehicle speed sensor such that the increase and decrease in value of electric current based on the value detected by the steering torque sensor and the vehicle weight sensor is modified by the value detected by the vehicle speed sensor.

3. A power steering apparatus according to claim 1, wherein said controlling means includes operation means in which the relationship between the magnitude of the steering torque and the value of electric current to be supplied to said electric motor is stored as a plurality of functional characteristics classified using the vehicle weight as a parameter, and said operation means is constituted to select one of said functional characteristics according to the value detected by said vehicle weight sensor and to calculate an electric current value on the selected functional characteristic which corresponds to the value detected by said steering torque sensor.

4. A power steering apparatus according to claim 3, wherein said detecting means includes a vehicle speed sensor for detecting vehicle speed, and said operation means stores therein the relationship between the magnitude of the steering torque and the maximum value of electric current to be supplied to said electric motor as a plurality of functional characteristics classified using the vehicle weight as a parameter, said operation means being constituted to select one of said functional characteristics according to the value detected by said vehicle weight sensor and to calculate an electric current value on the selected functional characteristic which corresponds to the value detected by said vehicle speed sensor.

* * * * *